United States Patent [19]

von Buren et al.

[11] Patent Number: 4,983,117

[45] Date of Patent: Jan. 8, 1991

[54] ANTI-DROOL INJECTION MOLDING APPARATUS

[75] Inventors: Stefan von Buren, Toronto; Anton S. Paulovic, Bolton, both of Canada

[73] Assignee: Husky Injection Molding Systems Ltd., Bolton, Canada

[21] Appl. No.: 456,542

[22] Filed: Dec. 26, 1989

[51] Int. Cl.⁵ .............................................. B29C 45/23
[52] U.S. Cl. .................................. 425/563; 264/297.2;
264/328.8; 264/328.11; 425/564; 425/567;
425/572; 425/574; 425/588
[58] Field of Search .............. 425/544, 562, 563, 567,
425/572, 574, 575, 581, 588, 595, 560;
264/297.2, 328.8, 328.9, 328.11

[56] References Cited

U.S. PATENT DOCUMENTS 4,867,938 9/1989 Schad et al. .................. 264/328.8

FOREIGN PATENT DOCUMENTS 166030 10/1983 Japan ................................ 425/588
1121912 6/1986 Japan ................................ 425/572

Primary Examiner—Timothy Heitbrink
Attorney, Agent, or Firm—Bachman & LaPointe

[57] ABSTRACT

Apparatus operative to reduce molten plastic drool when the injection unit is separated from the runner system. The apparatus includes access means for closing the runner system when the injection unit is disengaged therefrom and for opening the runner system for engagement with the injection unit, wherein the injection unit is operative to move the access means away from the runner system for engagement of the injection unit with the runner system.

7 Claims, 5 Drawing Sheets

ANTI-DROOL INJECTION MOLDING APPARATUS

BACKGROUND OF THE INVENTION

In the injection molding of plastic material it is common to utilize a hot runner system in which the machine nozzle or injection unit is disengaged from the hot runner as part of the cycle. During the injection phase of the cycle, the molten plastic resin in the hot runner is subjected to high injection pressure. Before the injection unit can be disengaged from the hot runner, however, this high injection pressure must be dissipated so that when the injection unit is separated from the hot runner, molten plastic is not expelled under pressure from the hot runner supply orifice. This expulsion of plastic from the hot runner on separation of the injection unit is normally termed "drool".

Prevention of drool is usually accomplished by "suckback". The injection unit is capable of injecting molten plastic at high pressure by virtue of a hydraulic piston pushing the plastic through the nozzle of the injection unit. Suckback occurs when the hydraulic piston is retracted instead of pushing the plastic and thereby causes a negative pressure in the machine nozzle or suckback. The retraction of the piston occurs prior to separation of the injection unit from the hot runner system and therefore the connected hot runner system is also depressurized or sucked back into the injection unit.

Theoretically perfect application of suckback leaves the hot runner system completely depressurized so that upon separation of the injection unit from the hot runner system no molten plastic will be expelled from either the hot runner supply orifice or from the mold gates, if open. However, this requires perfect application of suckback which may not be achieved. Also, resin compressibility for some resin can be as high as 20%. Only a very short period of time during the molten cycle is available for suckback and although the majority of depressurizing may be achieved, sufficient residual pressure and/or resin compressibility may remain to cause resin from the hot runner supply orifice upon separation of the injection unit therefrom. This has presented a significant problem in this art.

Various measures have been proposed to eliminate drool, as for example, a ball check valve or shut off valve. However, these are not entirely satisfactory. They represent an undesirable flow restriction in the supply channel of the hot runner. It causes a pressure drop and provides places for heat sensitive resins to hang-up and/or degrade. A shut-off valve requires time to operate in a depressurized condition, and in frequently operated cycles, valves like this tend to leak.

Another alternative is the use of an anti-drool bushing in the sprue bars of stack molds. These machines generally require the frequent separation of the machine nozzle from the hot runner supply orifice. The anti-drool bushing uses a sliding bushing in the sprue bar plus suckback. The bushing is pushed outward by the residual internal hot runner pressure in the manifold and sprue bar. In so doing, an increased volume of space is provided for the decompression resin, thus reducing drool. Upon re-engagement of the machine nozzle, the bushing is pushed back into the sprue bar. The disadvantage of the anti-drool bushing is that it does not actually close the orifice and therefore can still permit drool, albeit in reduced amounts.

It is therefore a principal object of the present invention to provide an improved injection molding apparatus which reduces drool when the injection unit is separated from the hot runner system, and which generally eliminates the drool entirely.

It is a still further object of the present invention to provide an improved apparatus as aforesaid which is simple and convenient to operate even in a high speed cycle and which is not accompanied by adverse side effects, as increased pressure drop or undesirable flow path restrictions.

SUMMARY OF THE INVENTION

In accordance with the present invention the foregoing objects and advantages are readily obtained and an improved, anti-drool injection molding apparatus obtained. The apparatus of the present invention comprises: a first machine platen and a second machine platen spaced from the first machine platen; a center section located between the first and second machine platens; at least one mold cavity adjacent the center section and generally at least two mold cavities with at least a first mold cavity between the center section and the first platen and at least a second mold cavity between the center section and the second platen; a runner system located in the center section communicating with said mold cavities; an injection unit comprising an injection nozzle engagable with said runner system for feeding molten plastic to said runner system and mold cavities; means to engage and disengage said injection unit from said runner system; and access means, generally plate means, for closing said runner system when the injection unit is disengaged therefrom and for opening said runner system for engagement with said injection unit, wherein said injection unit is operative to move the access means away from the runner system for engagement of the injection unit with the runner system. The access means is preferably a spring actuated plate means covering the runner system in the closed position and movable away from the runner system by the injection unit when the injection unit moves into engagement with the runner system. Means are generally provided for clamping the injection unit into tight engagement with the runner system.

The apparatus of the present invention generally eliminates drool when the injection unit is separated from the runner system. The access means immediately covers the runner system by the simple spring actuation system when the injection unit is separated therefrom, and simply moves away from the runner system by virtue of the actuation of the access means by the injection unit when the injection unit is returned to engage the runner system. These advantages are easily obtained in a high speed operating cycle without such adverse side effects as increased pressure drop and undesirable flow path restriction.

BRIEF DESCRIPTION OF THE DRAWINGS

The present invention will be more readily understood from a consideration of the accompanying drawings which describe preferred embodiments, wherein.

DETAILED DESCRIPTION

Figure 1:
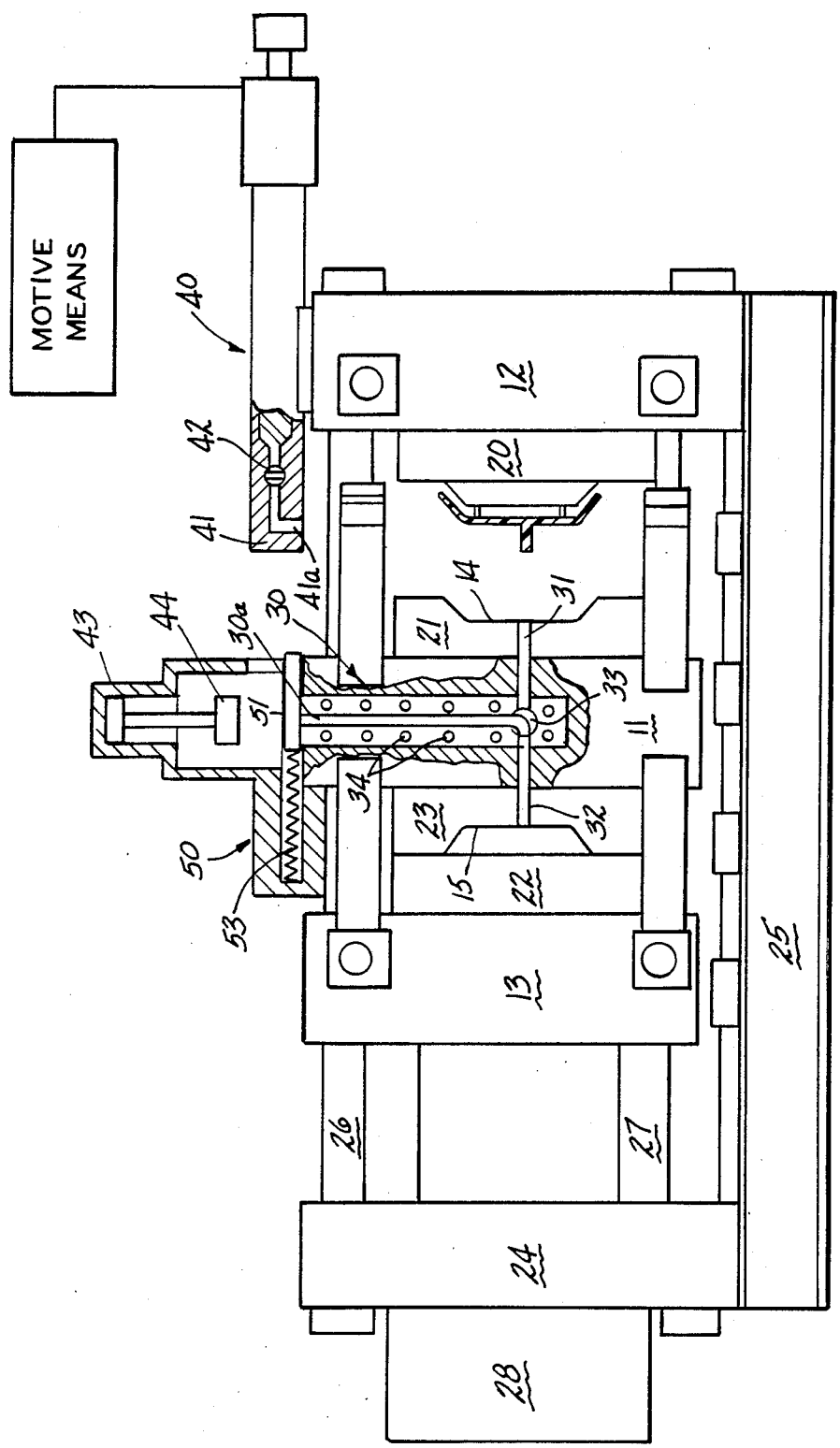
FIG. 1 shows a side view of a representative apparatus of the present invention with the injection unit separated from the runner system.
Figure 2:
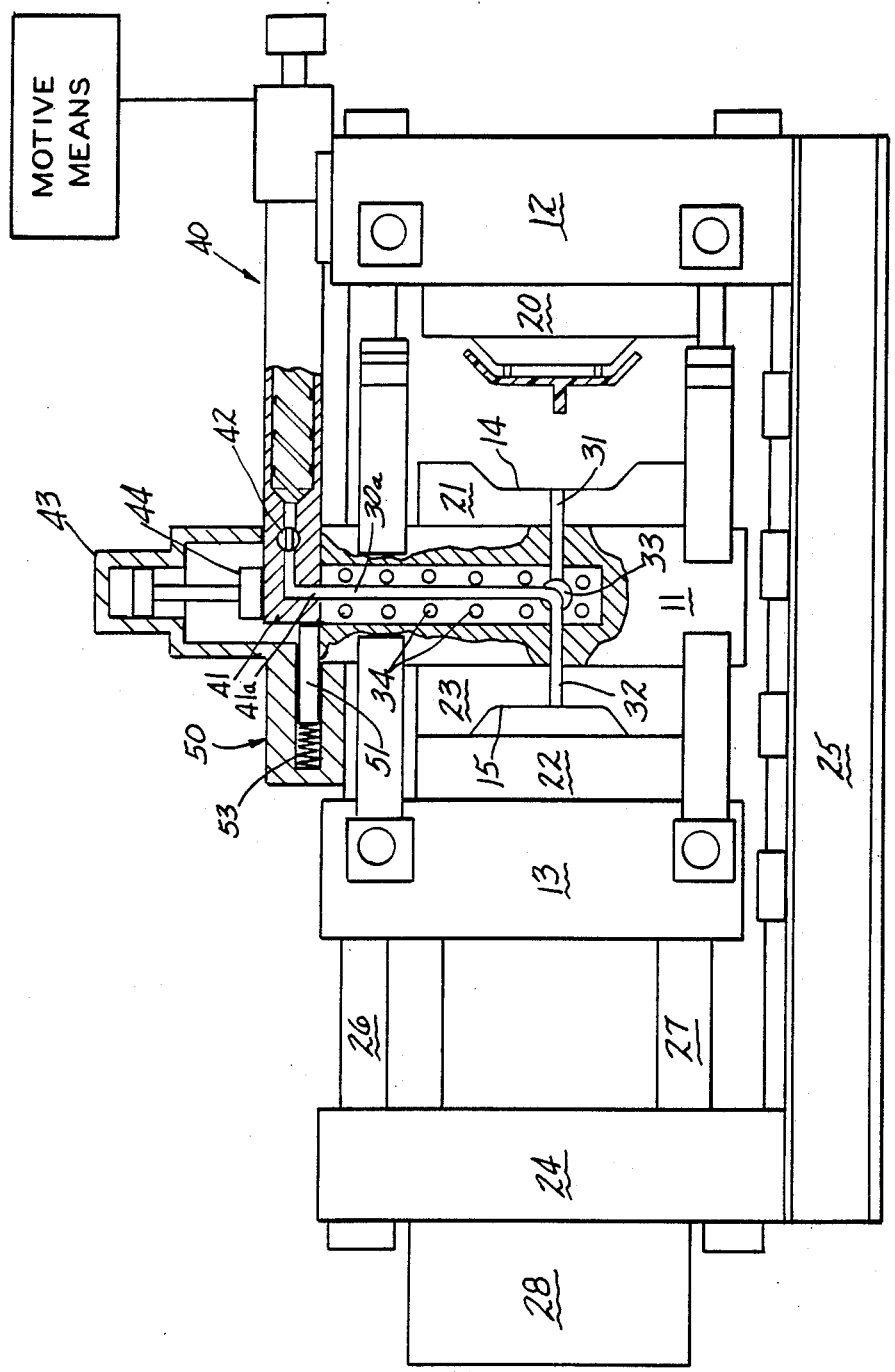
FIG. 2 shows the apparatus of FIG. 1 with the injection unit engaging the runner system.

Referring to FIGS. 1 and 2, a basic embodiment of the injection molding apparatus of the present invention is disclosed including a movable center section or platen 11 and stationary first machine platen 12 and a movable second machine platen 13 on either side of the center section. Mold cavities 14 and 15 are located on opposing faces of movable center section 11, with the first mold cavity 14 positioned between the first plate 12 and center section 11 and the second mold cavity 15 positioned between the second platen 13 and center section 11. Thus, the first mold set includes core half 20 affixed to first platen 12 by means not shown, cavity half 21 affixed to center section 11 by means not shown and the first mold cavity 14. The second mold set includes core half 22 affixed to second platen 13 by means not shown, cavity half 23 affixed to center section 11 by means not shown and second mold cavity 15. The mold cavities can of course be of the same or different configurations and several mold cavities can comprise each mold set.

Platens 12 and 24 are fixed to machine frame 25 and support tie bars 26 and 27 in the usual and customary manner. Platen 13 is connected to clamping piston 28 and is reciprocated thereby sliding on tie bars 26 and 27. Similarly, center section 11 is also movable on tie bars 26 and 27 and is releasably connected to movable second platen 13 and fixed first platen 12.

Center section 11 includes hot runner system 30 which distributes molten plastic resin to mold cavities 14 and 15 via branches 31 and 32, respectively depending upon which mold cavity selector valve 33 is set to fill. Hot runner system 30 includes heating means 34 to maintain the molten plastic at desired temperature. In FIG. 1, selector valve 33 is set to feed resin to mold cavity 15.

Injection unit 40 including injection nozzle 41 is engagable with and disengagable with hot runner system 30 via motive means to feed molten resin to the hot runner system. Shut off valve 42 in injection nozzle 41 prevents the feeding of further resin to the hot runner system when the injection unit is disengaged from the hot runner system as shown in FIG. 1. The injection nozzle 41 is releasably held against hot runner system 30 by hydraulic cylinder 43 operating piston 44. Naturally, other suitable means may be employed to releasably engage the injection nozzle with the hot runner system. This insures a tight seal between the injection nozzle and the hot runner system to resist the injection pressure of the resin as it is being conveyed to the molds. The present invention can readily be employed in the configuration shown in FIGS. 1 and 2, or with a stack-mold configuration using a movable sprue bar. The present invention is particularly advantageous when used with an offset sprue bar because it enables one to position the sprue bar at any desired location without the problem of drool.

After injection is complete, extruder "suckback" normally takes place. Extruder suckback is when the injection piston in the extruder is retracted slightly while the injection nozzle is still sealed against the mold manifold or hot runner system. The purpose of this is to depressurize the molds hot runner system so that when the mold is opened resin will not drool from the gates or the open channel of the hot runner system. However, extruder suckback is not always effective in preventing drool and the present invention includes access means 50 for closing the runner system 30 when the injection unit 40 is disengaged therefrom.

Figure 3:
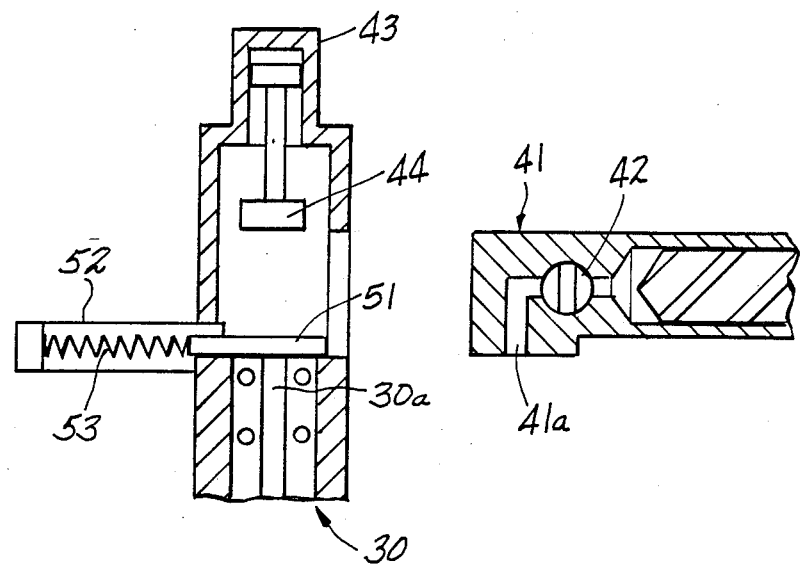
FIG. 3 shows an enlarged sectional view of the injection unit separated from the runner system a shown in FIG. 1.
Figure 4:
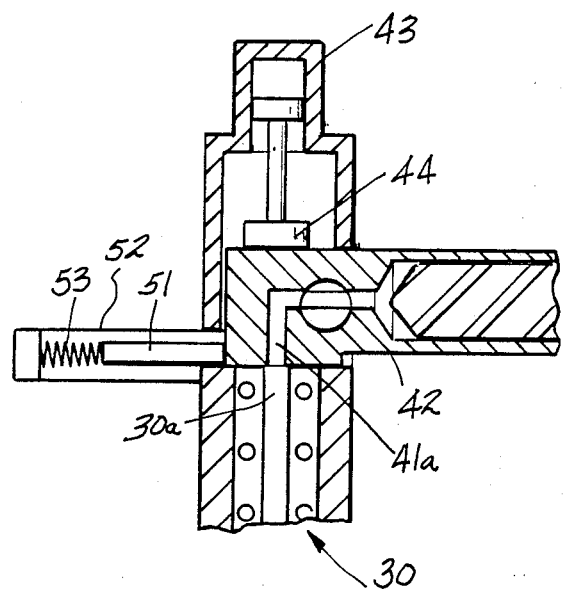
FIG. 4 shows an enlarged sectional view of the injection unit engaging the runner system as shown in FIG. 2.

A representative embodiment of the access means of the present invention is clearly shown in FIGS. 3 and 4 which show sliding plate 51 guided by gibs 52 and urged into a closed position by spring 53 and pushed out of the way by the closing action of injection nozzle 41 compressing spring 53. The end of plate 51 is engaged by the end of the injection nozzle causing the plate to be slid back as shown in FIG. 4. Thus, when the mold is fully closed the hot runner supply channel 30a is aligned with channel 41a in the injection nozzle and hydraulic cylinder 43 and piston 44 firmly clamp the injection nozzle to the hot runner system.

Thus, it can be seen that the access means 50 is operative to close the runner system when the injection unit is disengaged therefrom and to open the runner system for engagement with the injection unit. The injection unit is operative to move the access means away from the runner system for engagement of the injection unit with the runner system. The access means in a preferred embodiment is a spring actuated plate covering the runner system in the closed position and movable away from the runner system by the injection unit when the injection unit moves into engagement with the runner system.

Other variations will readily present themselves. For example, one may readily use primary clamping means as shown in FIGS. 1 and 2 plus secondary clamping means to clamp the individual mold cavities. Also, a secondary injection means or stuffer may readily be used to compensate for mold shrinkage.

Figure 5:
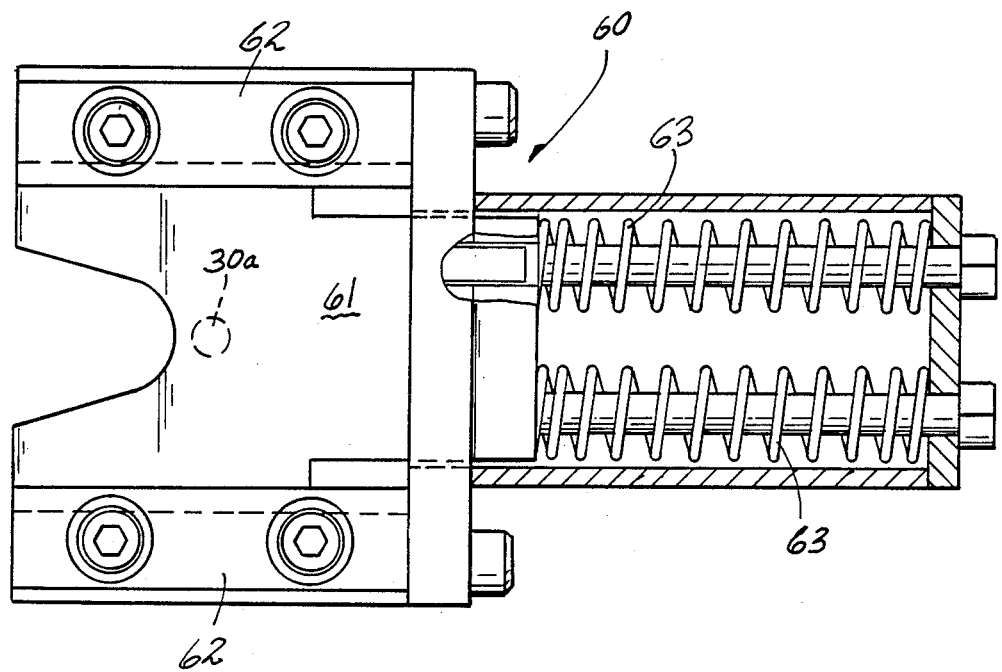
FIGS. 5 and 6 show detailed plan views of a representative access means of the present invention, with portions broken away, and with the runner system in the closed and open position, respectively.
Figure 6:
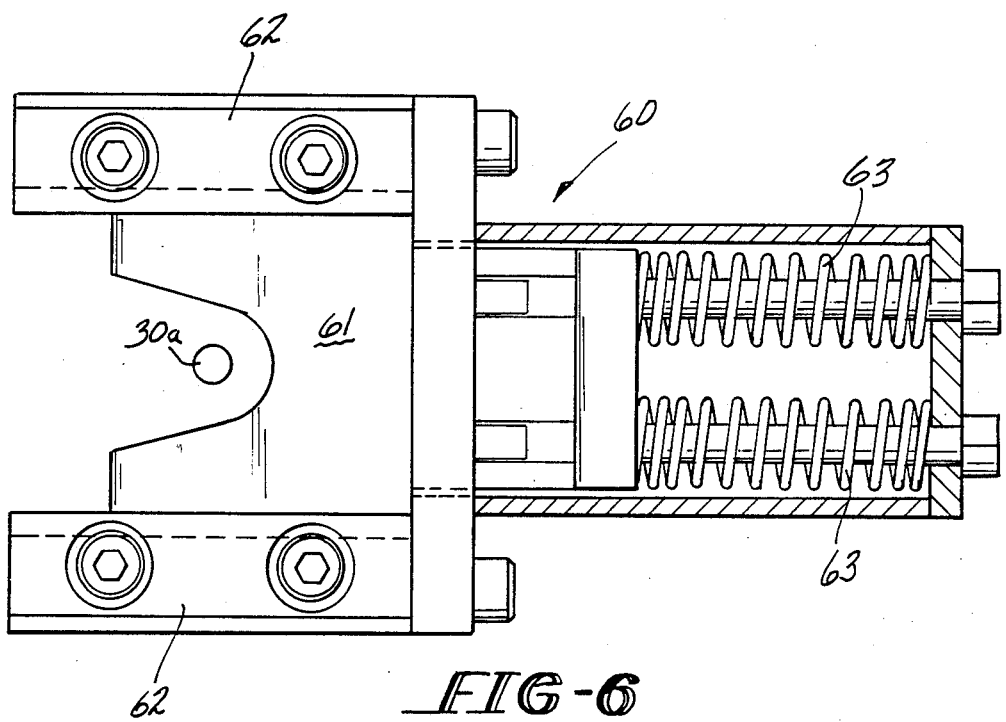

FIGS. 5 and 6 represent a preferred embodiment of an access means 60 comprising plate 61, gibs 62 and springs 63. FIG. 5 shows the access means 60 closing hot runner supply channel 30a and FIG. 6 shows the access means moved away from hot runner supply channel 30a.

Figure 7:
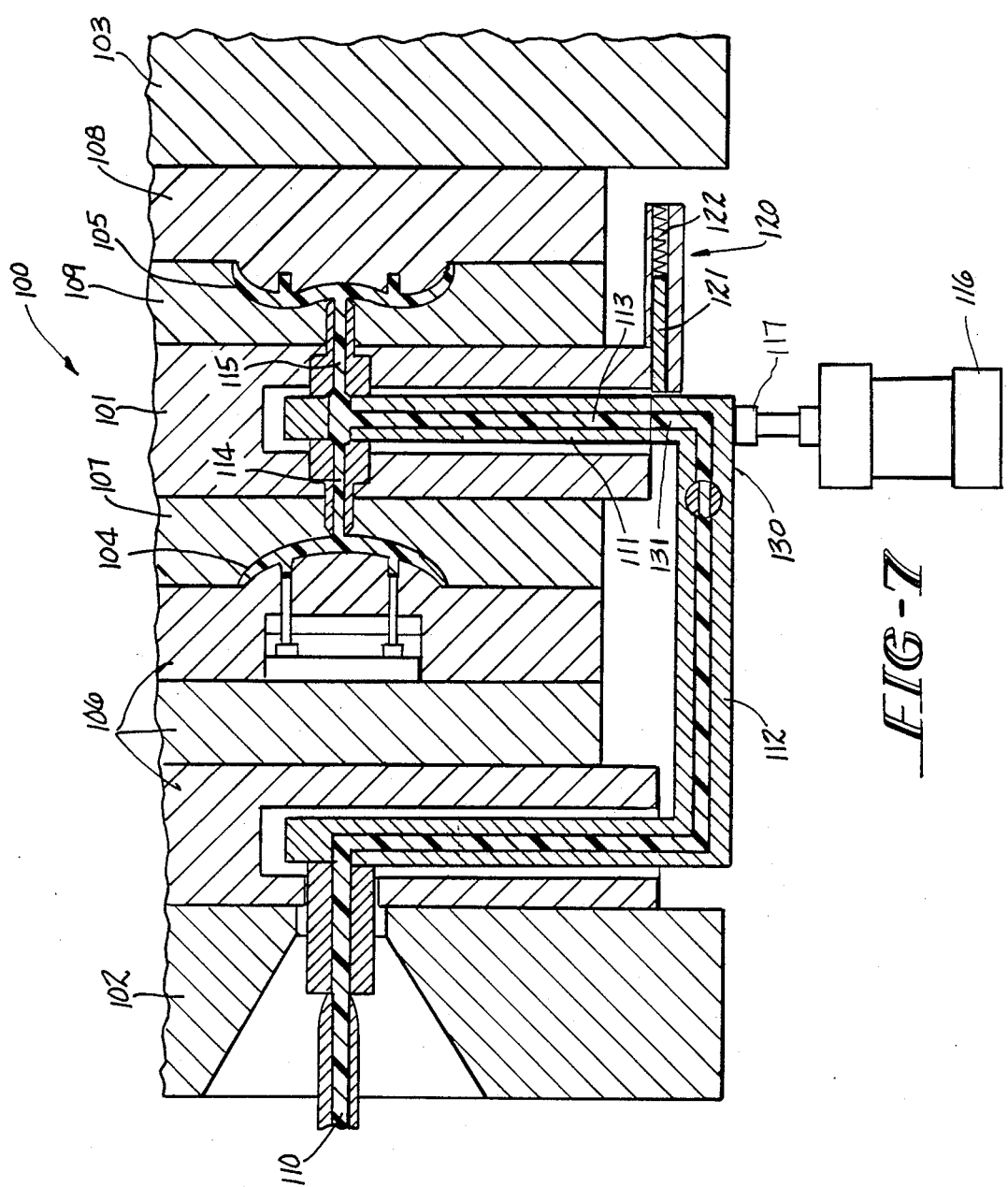
FIG. 7 shows a sectional view of a modified embodiment of the present invention utilizing a stack mold and a movable sprue bar.

The embodiment of FIG. 7 shows a stack mold and a movable sprue bar using the features of the present invention. In accordance with the embodiment of FIG. 7, stack mold 100 includes a movable center section or platen 101. Stationary first machine platen 102 and a movable second machine platen 103 are provided on either side of the stack mold. Mold cavities 104 and 105 are located on opposing faces of movable center section 101 with the first mold cavity 104 positioned between the first platen 102 and center section 101 and the second mold cavity 105 positioned between the second platen 103 and center section 101. Thus, the first mold set includes core half 106 affixed to first platen 102 by means not shown, cavity half 107 affixed to center section 101 by means not shown and first mold cavity 104. The second molding set includes core half 108 affixed to second platen 103 by means not shown, cavity half 109 affixed to center section 101 by means not shown and second mold cavity 105. Injection molding machine extruder nozzle 110 seals against and communicates with hot runner system 111 located in center section 101 by virtue of movable sprue bar 112. Hot runner system 111 includes channel 113 which feeds mold cavities 104 and 105 via branches 114 and 115 respectively. Sprue bar 112 is held firmly against supply channel 113 by hydraulic cylinder 116 and piston 117 in a manner after FIGS. 1 and 2. In a manner after FIGS. 1 and 2, access means 120 are provided including plate means 121 and spring means 122 which operate to open and close the runner system when the injection unit is engaged and disengaged from the runner system. In the embodiment shown in FIG. 7, the injection unit 130 has moved plate 121 away from runner system 111 so that injection channel 131 communicates with supply channel 113. When the sprue bar 112 and injection unit 130 is moved away from the runner system 113 by motive means not shown, spring means 122 will urge plate 121 into closing relationship over supply channel 113 in a manner as shown in FIG. 3 above.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An injection molding apparatus which comprises: a first machine platen and a second machine platen spaced from the first machine platen; a center section located between said first and second machine platens; at least one mold cavity adjacent the center section; a hot runner system located in the center section communicating with said at least one mold cavity; an injection unit comprising an injection nozzle engagable with said runner system for feeding molten plastic to said runner system and said at least one mold cavity; means to engage and disengage said injection unit from said runner system; and access means for closing said runner system when the injection unit is disengaged therefrom and for opening said runner system for engagement with said injection unit, wherein said injection unit is operative to move said access means away from said runner system for engagement of the injection unit with said runner system.

2. An apparatus according to claim 1 wherein said first machine platen is stationary, said second machine platen is movable and said center section is movable.

3. An apparatus according to claim 1 wherein said access means includes plate means.

4. An apparatus according to claim 1 including at least one first mold cavity between the first machine platen and center section and at least one second mold cavity between the second machine platen and center section.

5. An apparatus according to claim 4 wherein said access means includes a spring actuated plate covering said runner system and movable away from the runner system by said injection unit when the injection unit moves into engagement with the runner system.

6. An apparatus according to claim 4 including means for clamping the injection unit into tight engagement with the runner system.

7. An apparatus according to claim 4 wherein said injection unit includes a movable sprue bar engagable and disengagable with said runner system.

* * * * *